(12) United States Patent
Algüera et al.

(10) Patent No.: US 7,959,178 B2
(45) Date of Patent: Jun. 14, 2011

(54) CONNECTOR BRACKET FOR A SEMITRAILER OF A SEMITRAILER TRUCK

(75) Inventors: José Manuel Algüera, Aschaffenburg (DE); Michael Eiermann, Pfungstadt (DE); Martin Richter, Frankfurt am Main (DE)

(73) Assignee: Jost-Werke GmbH, Neu-Isenburg (DE)

( * ) Notice: Subject to any disclaimer, the term of this patent is extended or adjusted under 35 U.S.C. 154(b) by 26 days.

(21) Appl. No.: 12/309,368

(22) PCT Filed: Jul. 16, 2007

(86) PCT No.: PCT/EP2007/057336
§ 371 (c)(1),
(2), (4) Date: Aug. 24, 2009

(87) PCT Pub. No.: WO2008/009660
PCT Pub. Date: Jan. 24, 2008

(65) Prior Publication Data
US 2010/0059967 A1 Mar. 11, 2010

(30) Foreign Application Priority Data
Jul. 18, 2006 (DE) .................. 10 2006 033 899

(51) Int. Cl.
*B60D 1/62* (2006.01)
(52) U.S. Cl. ...... 280/420; 280/421; 280/422; 280/423.1
(58) Field of Classification Search .................. 280/420, 280/421, 422, 423.1
See application file for complete search history.

(56) References Cited

U.S. PATENT DOCUMENTS

| 3,888,513 | A | * | 6/1975 | Pilz et al. | 280/421 |
| 5,961,140 | A | * | 10/1999 | Huskey | 280/507 |
| 6,089,907 | A | * | 7/2000 | Shoblom | 439/528 |
| 7,581,746 | B2 | * | 9/2009 | Abate et al. | 280/422 |
| 7,731,215 | B2 | * | 6/2010 | Alguera | 280/420 |
| 7,793,966 | B2 | * | 9/2010 | Richter et al. | 280/433 |
| 2008/0036175 | A1 | * | 2/2008 | Alguera | 280/420 |

FOREIGN PATENT DOCUMENTS

| DE | 103 44 253 A1 | 4/2005 |
| DE | 10 2004 024333 A1 | 12/2005 |
| WO | WO 01/46001 A2 | 6/2001 |
| WO | WO 03/039940 A1 | 5/2003 |
| WO | WO 2005/110836 A1 | 12/2005 |

* cited by examiner

*Primary Examiner* — Paul N Dickson
*Assistant Examiner* — Marlon A Arce
(74) *Attorney, Agent, or Firm* — Hudak, Shunk & Farine Co. LPA

(57) ABSTRACT

The invention relates, inter alia, to a connector bracket for a semitrailer of a semitrailer truck. Said connector bracket comprises a support element which can be swiveled about a bearing and a connector arranged inside the support element, the support element having a casing frame with a section that is complementary to an insertion opening of a fifth wheel. The aim of the invention is to provide a connector bracket or a plug-in coupling which is highly reliable even under adverse external conditions. This aim is achieved, inter alia, by the connector bracket according to the invention, wherein the casing frame can be displaced in relation to the connector by contact with the insertion opening, thereby displacing the connector from a closed standby position to an open coupling position.

16 Claims, 8 Drawing Sheets

CONNECTOR BRACKET FOR A SEMITRAILER OF A SEMITRAILER TRUCK

FIELD OF INVENTION

The invention concerns a connector bracket for a semitrailer of a semitrailer truck, comprising a support element which can swivel about a bearing and a connector arranged in the support element, the support element having a casing frame with a segment shaped complementary to an insertion opening of a fifth wheel. Furthermore, the invention is also implemented on a plug-in coupling system.

BACKGROUND OF THE INVENTION

Such connector brackets and plug-in coupling systems are used on semitrailer trucks, after a mechanical coupling of the semitrailer, to also connect the supply lines of the tractor vehicle to the semitrailer in largely automated fashion, so that the driver no longer has to climb between the tractor and the semitrailer and plug in the connection lines there, such as for the compressed air and electricity supply, by hand.

One prior art of this kind is disclosed by DE 10 2004 024 333 A1 with a plug-in coupling system, in which a plug-in device on the semitrailer with a connector arranged stationary therein is introduced into a socket arranged underneath the insertion opening. Thus occurs while a king pin situated on the underside of the semitrailer bottom is driven into the fifth wheel. For this, the plug-in device has a wedge shape, matched to the geometry of the insertion opening, so that it is secured with form fitting by the insertion opening. When the semitrailer truck is driving on a curve, the plug-in device swivels in fixed position within the insertion opening, thanks to its being mounted so as to rotate about the king pin. The major drawback of this known system is that the connector at the semitrailer is open in the driving direction and subjected to considerable dirt and grime during the drive. This problem is further aggravated when semitrailers outfitted with the known plug-in device are used in a mixed fleet whose tractor vehicles are outfitted with a socket not yet designed complementary to the connector, for then solids swirled up by the tractor can get into the connector pointing opposite the driving direction. In the winter months, the plug-in device can also become disabled by ice build-up.

SUMMARY OF THE INVENTION

For this reason, the basic problem of the invention is to provide a connector bracket or a plug-in coupling system which enables a good operational availability even under adverse external influences.

The problem is solved according to the invention with a connector bracket in which the casing frame can move relative to the connector by making contact with the insertion opening and thus the connector can travel from a closed standby position to an opened coupling position.

In the closed standby position, the connector is entirely embedded in the boxlike support element and thereby protected against external influences. As the king pin is being introduced into the insertion opening of the fifth wheel, the support element with a segment complementary to the geometry of the insertion opening abuts against the lateral walls of the insertion opening. As the king pin moves further in until it engages with the locking mechanism of the fifth wheel, the casing frame of the support element is pushed laterally backward relative to the king pin and the connector is released to make contact with a socket on the tractor vehicle.

A major benefit of the invented connector bracket is that the connector can travel mechanically between the standby position and the coupling position. Therefore, it is not necessary to provide a self-sufficient power supply for the semitrailer or to install additional servo motors on the semitrailer. Since the support element is adapted to the ISO contour of the insertion opening, semitrailers outfitted with the connector bracket can be hooked up without problem by tractor vehicles with conventional supply lines plugged in by hand.

It has proven to be especially advantageous to have the connector spring-loaded in the direction of travel, so that while driving the lengthwise play between fifth wheel and king pin is not transmitted to the connector, which would result in increased wear and tear.

According to one advantageous embodiment, the support element comprises a support frame, which engages with the bearing. In this design configuration, the support frame constitutes a fixed connection of components of the support element to the king pin or the preferably ring-shaped bearing placed around it and the casing frame which can move during the coupling processes of tractor and semitrailer. The position of the king pin after a locking of the locking mechanism, together with the length of the support frame, defines the position of the support element inside the insertion opening of the fifth wheel.

Preferably, the connector is arranged on a closing plate, which is guided relative to the casing frame by means of a restricted guidance. The closing plate closes the support element at the bottom or also in a preferred embodiment at the rear in the standby position. During the coupling process of the connector and the socket of the tractor vehicle, the casing frame travels in horizontal direction opposite the driving direction, while the closing plate is shifted in vertical direction to a level dictated by the restricted guidance.

The restricted guidance can be a link motion, for example.

Preferably, the link motion comprises two link walls formed stationary on the casing frame and guide cams of the closing plate engaging with them. The link walls are preferably each welded as a double wall stationary to the two opposite side walls of the casing frame pointing in the driving direction.

In one especially preferred embodiment, the link wall is formed by two U-shaped links. In this embodiment, two guide cams arranged in front on the closing plate can engage with the U-shaped links, each situated in front in the driving direction, and two rear guide cams can engage in the opposite rear U-shaped links. The guide cams should be such that a sideways sliding out from the particular link is prevented. The oppositely placed links should have a mirror-image link travel. Thanks to the links spaced apart from each other, it is possible to move the closing plate, especially with the connector located on it, to reach the coupling position by utilizing the change of position of the casing frame to a position vertically displaced from the casing frame in the coupling position.

Every two links formed into a link wall can be arranged staggered in the horizontal direction next to each other. Consequently, for two link walls opposite to each other the two front guide cams of the closing plate will be guided in the front pair of links and the two rear guide cams in the rear pair of links. This has the benefit that the front guide cams located in the front links will travel a path spatially independent of the rear links and in this way a corresponding slanted position of the closing plate along the path of the casing frame is also conceivable.

Preferably, the front U-shaped link has a front leg which broadens in the driving direction. According to one advantageous embodiment, at least one vertical spring is also arranged between the support frame or the lever plate and the closing plate. The conically broadening leg with the help of the vertical spring makes possible a reclosing of the closing plate if no socket is present at the tractor side when the closing plate is in the downwardly lowered coupling position.

The spring element would then pull the front guide cams in the vertical direction against the upper edge of the particular front-broadened leg. On the other hand, if a socket is present, the front guide cams will bear against the lower edge of the broadened guide.

Advantageously, the support element has a lever plate, which is articulated by a first end to the support frame and by the opposite second end to the closing plate. By lever plate is also meant single levers, regardless of their material nature. The lever plate is basically mounted by one end on a stationary structural part. The opposite end, on the other hand, prevents the closing plate from being forced back to the same extent when the casing frame slides back. The connection of the closing plate to the support frame, which is stationary in the lateral direction, enables a retraction of the connector along with the closing plate, thanks to the link motion.

Preferably, the lever plate or the support frame is configured with a shutter, which covers the connector especially when the casing frame is in the advanced position and no tractor vehicle is present. This shutter is a curved plate that hangs downward and is mounted stationary, when fastened to the support frame, or nearly stationary, when fastened to the lever plate, thanks to its slight mobility relative to the closing plate. The connector will move more or less behind the shutter, depending on the position of the closing plate and the connector mounted on it.

At least one casing return spring can be arranged between the support frame or the lever plate and the casing frame. Especially preferably, there are two casing return springs arranged in parallel. The casing return spring arranged to pull back the casing frame against the direction of movement when hooking up the king pin, so that the casing frame is pulled back into the standby position when dismounting the semitrailer after losing the form fitting with the insertion opening of the fifth wheel.

It has proven to be especially favorable to have at least one guide rail arranged in the lengthwise direction in the casing frame. Instead of one guide rail, two parallel rods can also run through the casing frame in its full length and also pass through a stationary segment of the support frame. The at least one guide rail makes sure that the casing frame is fixed in the vertical direction when it is moving back horizontally.

Alternatively to the above described embodiment, the closing plate can also be flexible in configuration and installed with pretension in the closed position. Especially good for this is a two-part configuration of the closing plate, in which one uses a lower flexible plate and on top of this a largely rigid plate carrying the connector. Thanks to the natural restoring forces of the material, the lower flexible plate ensures a closing of the support element at the bottom and needs no additional spring elements, such as vertical springs.

The problem of the patent is also solved by a plug-in coupling system with a connector bracket situated at the semitrailer and a socket arranged beneath an insertion opening of a fifth wheel. According to the invention, the casing frame here can also be displaced relative to the connector by making contact with the insertion opening and thus the connector can travel from a closed standby position to an open coupling position, and the socket also has a closing shutter. The connection of connector and socket occurs solely through the insertion of the king pin into the fifth wheel.

Thanks to the connector and socket being oriented in the longitudinal direction of the vehicle, neither does the plug-in coupling system incur any damage even upon emergency activation of the locking mechanism to release the semitrailer. In these cases, connector and socket are pulled apart and thereby released from each other as during a normal uncoupling of the semitrailer.

The system of the invention extensively protects both the connector and the connector bracket against dirt and grime.

The arrangement of the connector bracket underneath the insertion opening should also correspond to the ISO contour of fifth wheels. This makes it possible to mount a conventional semitrailer on a tractor vehicle which is already outfitted with a socket.

Preferably, the support element knocks open the closing shutter as it draws near to it. Here as well, no additional servo motors are needed. The opening of the closing shutter can be done, for example, by a control cam.

Preferably, a vertical movement occurs after the connector and socket make contact, during which a locking element of the socket engages with the connector in form fitting. In this way, the connector is locked in the socket. The locking element can be configured, for example, as a stationary link. Thanks to the upward movement of the socket during the entry into the connector, the socket is then displaced relative to the stationary locking element.

The locking of the connector in the socket is preferably free of play, in order to prevent movements and thus an accelerated corrosion after contact has been made.

BRIEF DESCRIPTION OF THE DRAWINGS

For a better understanding, the invention shall be explained more closely below by means of 10 figures. These show:

FIG. 7b: a perspective bottom view of the connector bracket per FIG. 7a;

FIG. 8b: a perspective bottom view of the connector bracket per FIG. 8a;

FIG. 9b: a perspective bottom view of the connector bracket of FIG. 9a;

FIG. 10b: a perspective bottom view of the connector bracket per FIG. 10a.

DETAILED DESCRIPTION OF THE INVENTION

Figure 1:
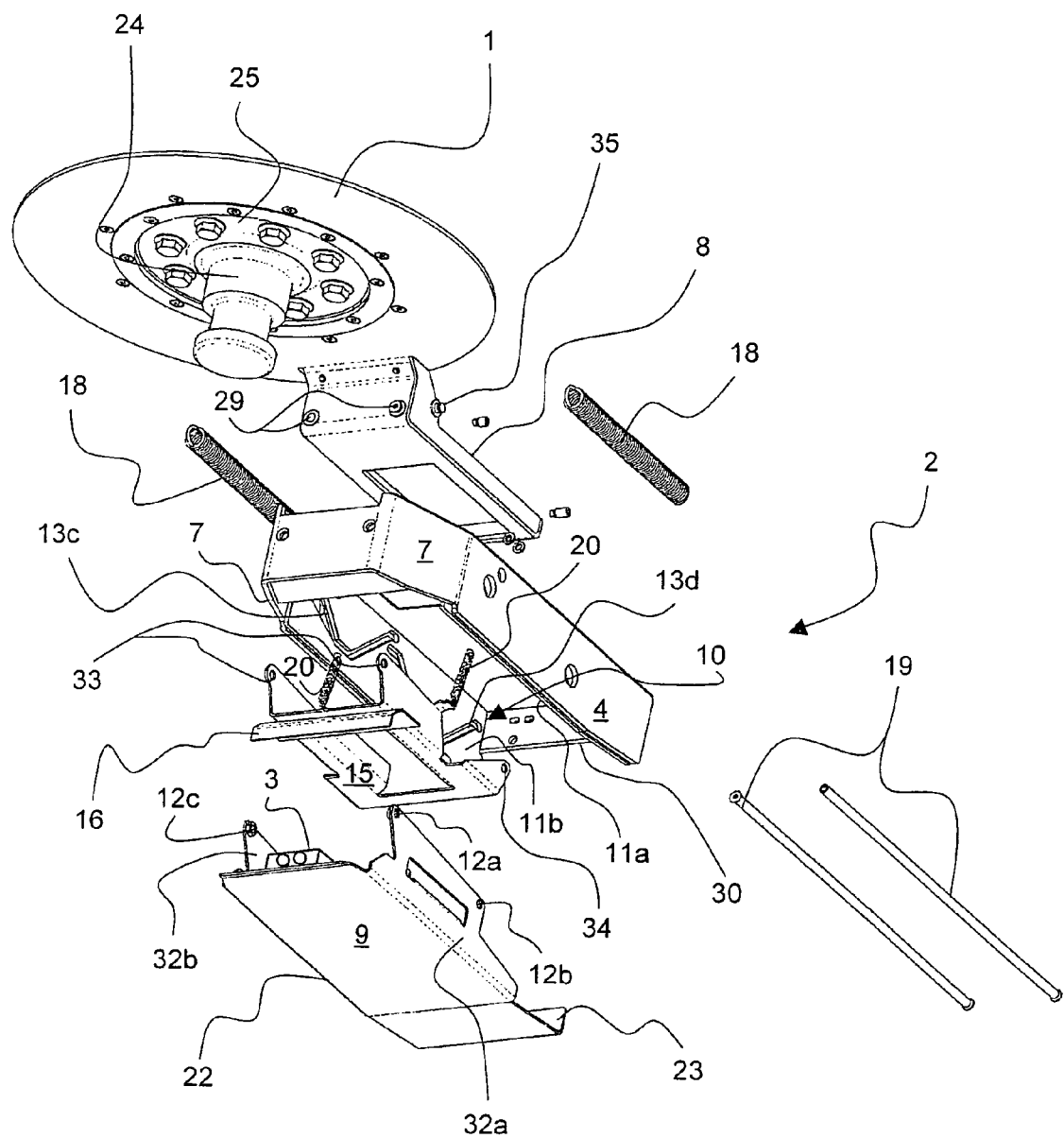
FIG. 1: an exploded view of a connector bracket according to the invention.

FIG. 1 shows a three dimensional bottom view of exploded components of the connector bracket of the invention. The support element 2 engages by means of a rigid support frame 8 with a bearing 1 and can thereby swivel on the underside of a semitrailer, not shown. The bearing 1 concentrically surrounds a king pin 24. The king pin 24 is screwed torsion-free against the bottom side of the semitrailer by a fastening disk 25.

A casing frame 4 is fastened to the support frame 8 and it can move in the horizontal direction. The horizontal movability is accomplished by two parallel guide rails 19, running through the casing frame 4 in the lengthwise direction, being fashioned as cylindrical rods and being guided by a slide bearing 29 for each on the support frame 8.

When there is no fifth wheel 6 present (see FIG. 4), the casing frame 4 is held in its forward position by two casing return springs 18, that is, at a slight distance from the king pin 25. The casing return springs 18 for this purpose are hung by one end from the support frame 8 and by the other end from the rear wall 30 of the casing frame 4. The casing return springs 18 run on both sides between the inward lying support frame 8 and the casing frame 4. This forward position of the casing frame 4 corresponds to the closed standby position of the support element 2.

The casing frame 4 has a predominantly boxlike basic shape with a rectangular cross section. At its front end, one notices slanting segments 7 on both sides, whose inclinations are configured to match the inclination of side walls 31 of an insertion opening 5 of the fifth wheel 6, as is especially well evident in FIG. 5. During the insertion of the king pin 24 into the fifth wheel 6, the segment 7 abuts against the side walls 31 and orients the support element 2 centrally in the lengthwise direction of the vehicle. Since the casing frame 4 is spring loaded against the support frame 8, this contact and thus the central orientation of the support element 2 also continues during the driving operation.

One link wall 11a, 11b each is welded on the inside of the parallel side walls of the casing frame 4, of which the link wall 11b is especially well evident in the diagram of FIG. 1. The link wall 11a is provided with two horizontally spaced V-shaped links 13a, 13b and the link wall 11b with two mirror-image links 13c, 13d as well.

The casing frame 4 is close at the bottom by a closing plate 9 in the standby position. The closing plate 9 carries the connector 3 on its top side, which when a socket 17 is present on the tractor vehicle (see FIG. 4) is lowered into a coupling position which is lowered from the casing frame 4. The closing plate 9 has upright side pieces 32a, 32b on both lengthwise sides, in which the respective guide cams 12a, 12b and 12c, 12d are inserted. In the assembled condition, the front guide cams 12a, 12c project into the two front links 13a, 13c and the rear guide cams 12b, 12d into the two rear links 13b, 13d. The links 13a-d and the guide cams 12a-d together form a restricted guidance 10 for the closing plate 9.

The transfer of force of the movable casing frame 4 to the closing plate 9 occurs by a lever plate 15. For this, the lever plate 15 is provided with two front fastening holes 33, into which protrude, in the assembled condition, projections 35 sticking out on either side of the support frame 8. The rear fastening holes 34 are articulated with the rear guide cams 12b, 12d of the closing plate 9. When the casing frame 4 is retracted, the closing plate 9 is prevented by the lever plate 15 from likewise moving back with the casing frame 4 and instead it follows the path of the links 13a, 13b, 13c, 13d.

Figure 2:
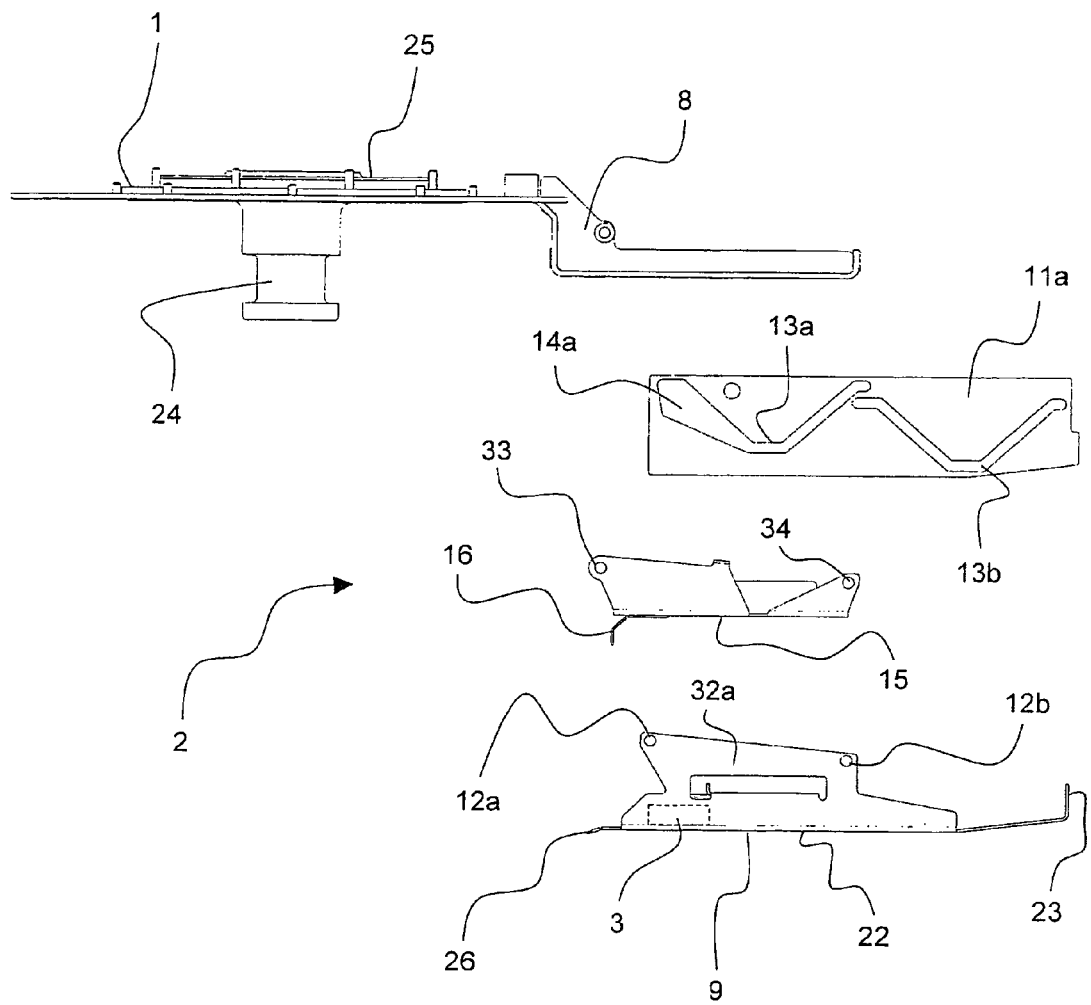
FIG. 2: a side view of a support frame, a link wall, a lever plate and a closing plate.

FIG. 2 shows in a side view a support frame 8, a link wall 11a, a lever plate 15 and a closing plate 9, which along with other structural parts not shown form the support element 2. The link wall 11a is welded in customary fashion to the inside of the casing frame 4, which for clarity has been left out of FIG. 2. Basically, it is also possible to fashion the casing frame 4 itself with appropriately shaped links 13a-13d. However, introducing the link walls 11a, 11b later on has the advantage of simplifying the fabrication. Furthermore, the links 13a-13d are completely covered by the casing frame 4, which substantially reduces particles of dirt from getting into the support element 2.

The links 13a, 13b which can be seen in FIG. 2 have a comparable symmetrical U-shaped configuration and are arranged alongside each other in the horizontal direction. Structural space can be economized in the horizontal direction by a vertical arrangement slightly staggered from each other.

A front link leg 14a broadens conically in the direction of the king pin 24, so that the front guide cam 12a of the closing plate 9 that is guided therein is mounted with a vertical play.

The lever plate 15 is flat on its underside. In a forward region, it engages with a downwardly curved shutter 16, into the protection of which the connector 3 dives when a closing plate 9 is pushed forward in the links 13a-13d.

The closing plate 9 comprises a level bottom wall 22 and side pieces 32a, 32b sticking up perpendicular to it, only the side piece 32a with the guide cams 12a, 12b being visible in the side view. The connector 3 is also concealed by the side piece 32a and therefore only shown by dotted line. At its front end, the bottom wall 22 has a downwardly bent entry edge 26 engaging with it. As the support element 2 draws near to a stationary socket 17 (see FIG. 4), this serves to facilitate the pushing in of the socket 17, thereby holding open the closing plate 9.

At the opposite end of the closing plate 9 from the entry edge 26 the bottom wall 22 is bent upward and thereby forms a rear wall 23.

Figure 3:
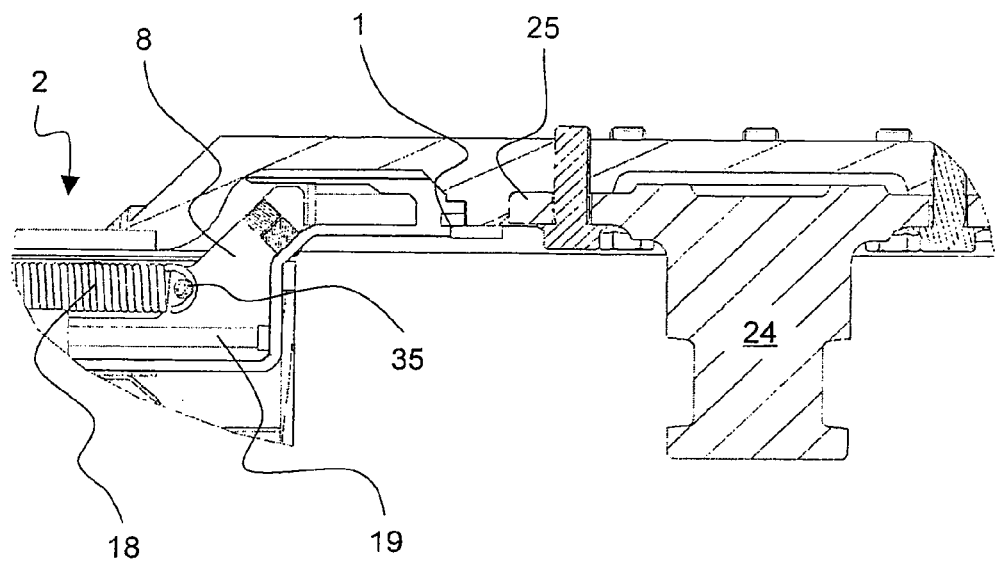
FIG. 3: a cross section through a bearing arranged about the king pin and the upper region of the connector bracket.

FIG. 3 shows a cross section through the king pin 24 in the lengthwise axis of the vehicle. The bearing 1 and the support frame 8 pivoting on it are for the most part flush with the underside of the semitrailer bottom, not further indicated. Inside the support element 2 one notices the front casing return spring 18, which is fixed stationary to the projection 35. Beneath the casing return spring 18, a guide rail 19 runs parallel to it.

Figure 4:
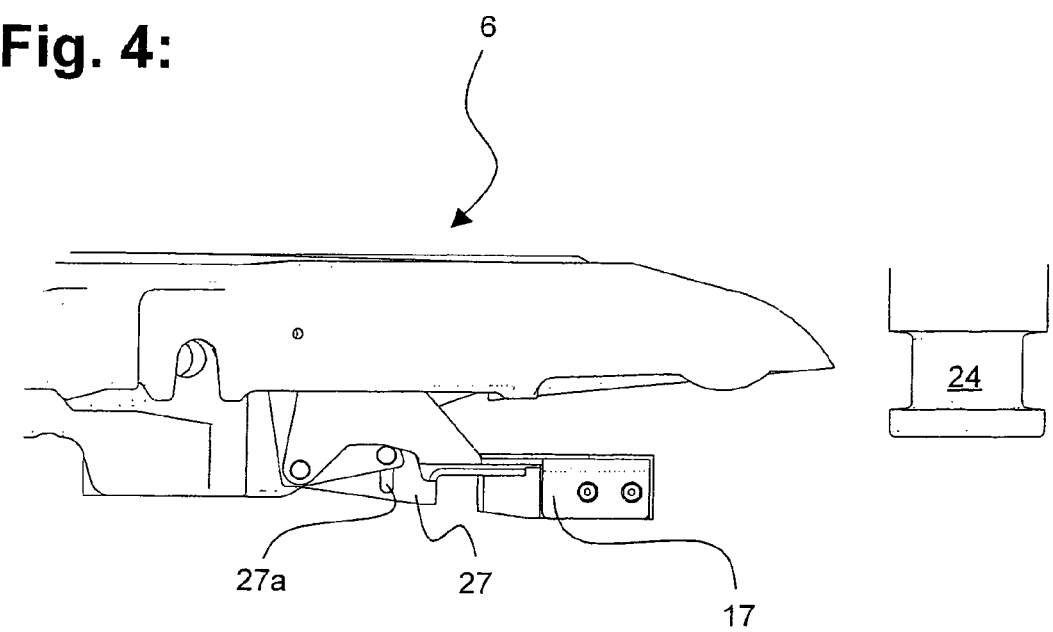
FIG. 4: a side view of a fifth wheel with socket arranged on it in a starting position.

FIG. 4 shows in side view a fifth wheel 6 with a socket 17 fastened to it, prior to hooking up a king pin 24 which has already come close to it. The socket 17 lies on a level beneath the king pin 24 and the fifth wheel 6 can travel over it for the coupling process. Because the socket mounting 27 is movable upward thanks to an oblong hole 27a, the socket 17 can be deflected upward.

Figure 5:
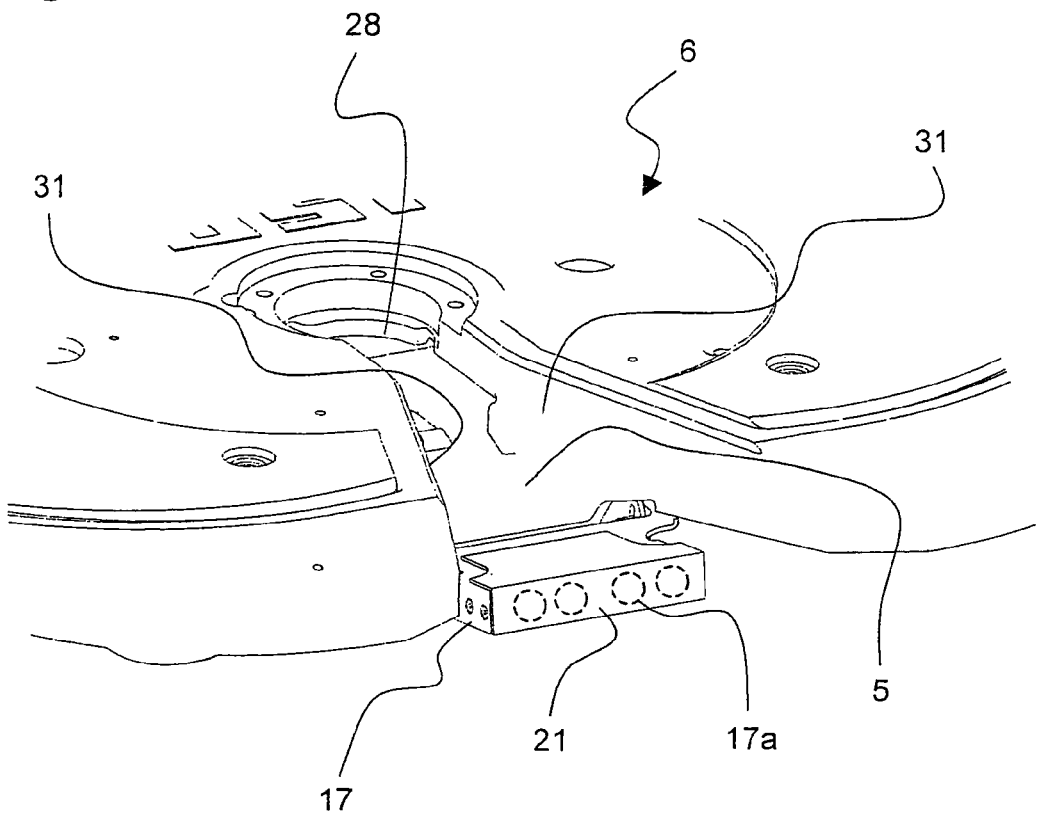
FIG. 5: a perspective rear view of a fifth wheel with socket arranged on it in a starting position.

FIG. 5 shows the fifth wheel 6 in a perspective rear view with a socket 17. The current carrying contacts 17a pointing to the rear in the socket 17 are covered by a closing shutter 21. As the king pin 24, not shown here, travels in as far as a closing region 28 of the fifth wheel 6, the closing shutter 21 is grabbed by the support element 2 and swiveled upward, so that the current carrying contacts 17a underneath it can be brought to engage with the connector 3.

Figure 6:
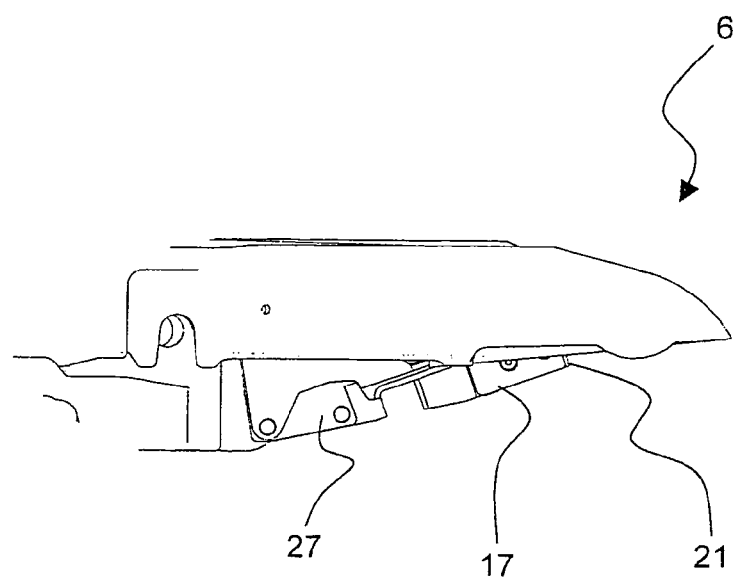
FIG. 6: a side view of a fifth wheel with socket arranged on it, the fifth wheel being folded down in the locking position.

FIG. 6 shows a fifth wheel 6 with a socket 17 swung upward as far as it goes. In this position, the socket 17 is located between the side walls 31 of the insertion opening 5. This is especially the case when the fifth wheel 6 is tilted as much as possible to the rear about its bearing when the semitrailer has been uncoupled.

Figure 7A:
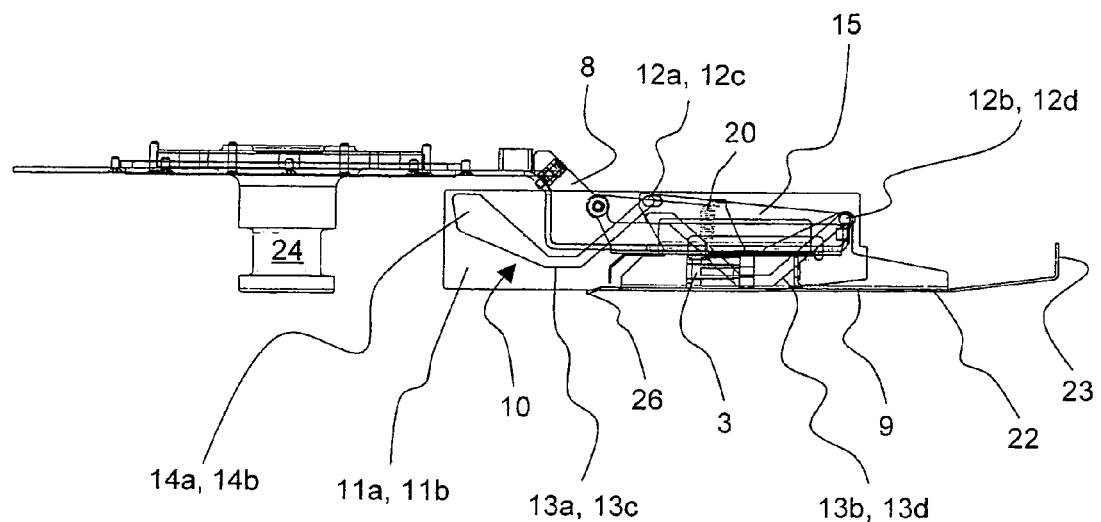
FIG. 7a: a side view of a connector bracket in the dismounted condition.
Figure 7B:
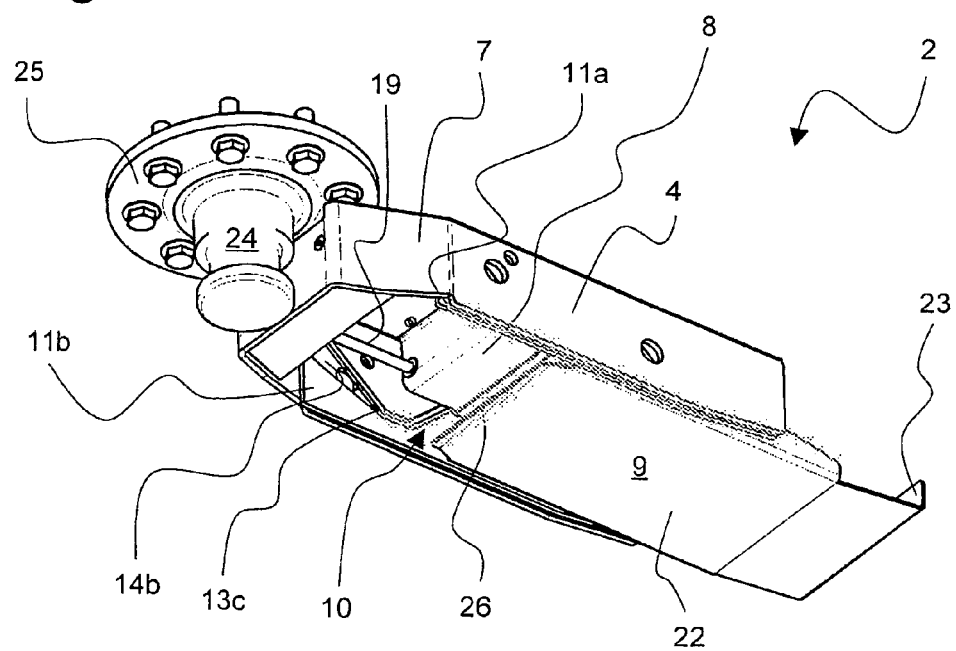

FIGS. 7a and 7b show the connector bracket of the invention with the semitrailer dismounted, while in FIG. 7a the casing frame 4 has been left out for purposes of clarity. Before hooking up the semitrailer, the link walls 11a, 11b lying one behind the other are in a maximum advanced position relative to the king pin 24. The front guide cams 12a, 12c of the closing plate 9 are in rear position within the front links 13a, 13b and the rear guide cams 12b, 12d in a rear position within the rear links 13b, 13d. The lever plate 15 has taken up a horizontal position for the most part parallel with the bottom wall 22. The connector 3 is located between the link walls 11a, 11b and covered at the bottom by the closing plate 9.

Figure 8A:
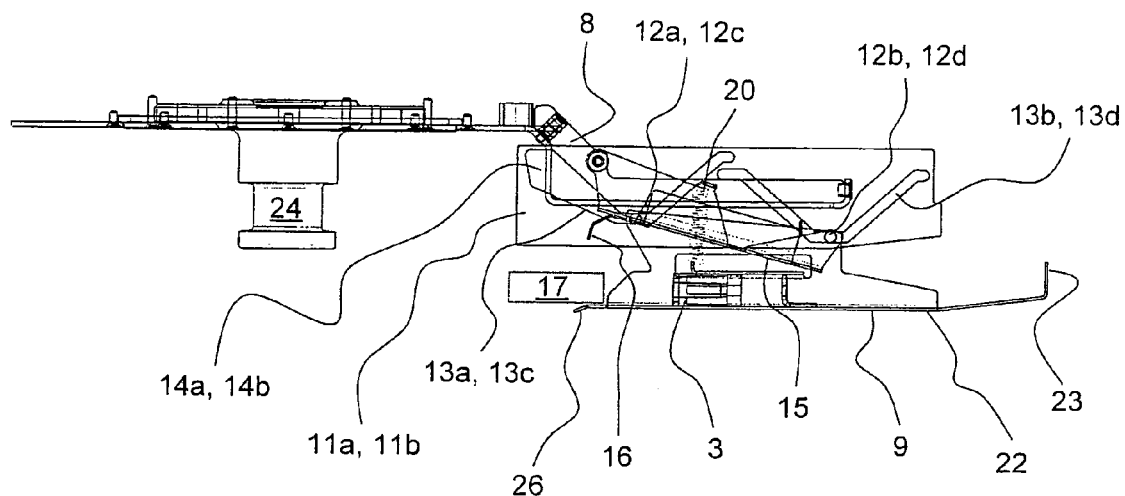
FIG. 8a: a side view of a connector bracket during the mounting of a semitrailer, immediately before the connector and socket make contact.
Figure 8B:
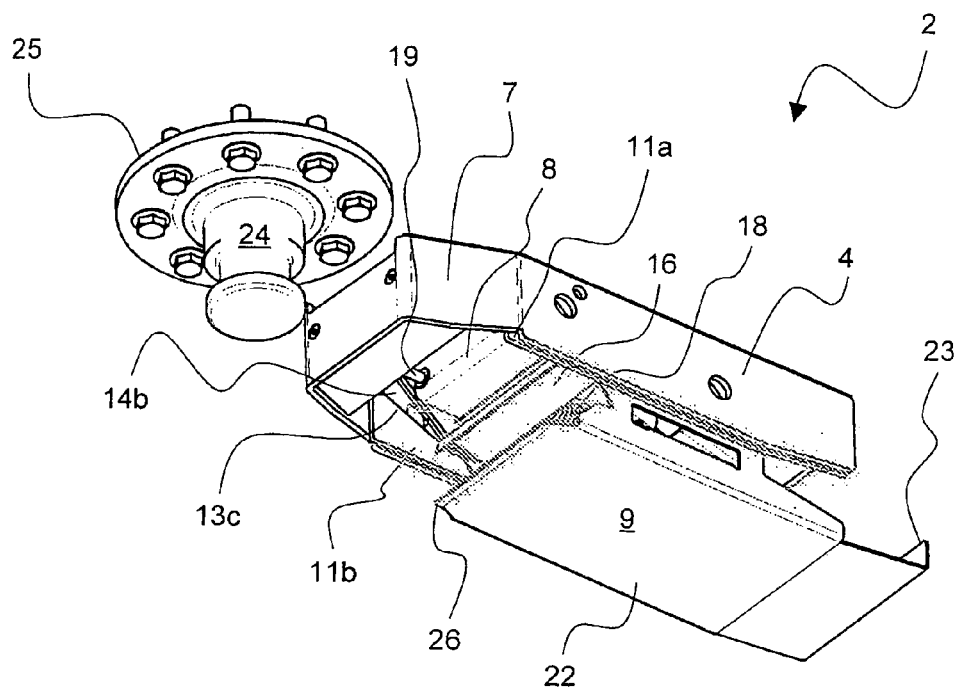

FIGS. 8a and 8b illustrate the functional position of the major structural parts immediately before contact is made between the connector 3 and the socket 17. In this position, the king pin 24 has already traveled into the fifth wheel 6 and approximately reached the closing region 28 (see FIG. 5). Thanks to the contacting of the casing frame 4 or its segments 7 with the side walls 31 of the insertion opening 5, the link walls 11a, 11b have been pushed together relative to the king pin 24. However, the lever plate 15 has prevented the closing plate 9 from shifting backward. As a result, the front guide cams 12a, 12c are now situated at the lowermost point of the front links 13a, 13c and the rear guide cams 12b, 12c at the lowermost point of the V-shaped rear links 13b, 13d. Due to the approximately identical vertical level of the front guide cams 12a, 12c and the rear guide cams 12b, 12d, the closing plate 9 has been forced downward parallel to its original standby position. In this position, the socket 17 on the tractor side has already slipped across the entry edge 26 and thereby holds the closing plate 9 in the open position.

Figure 9A:
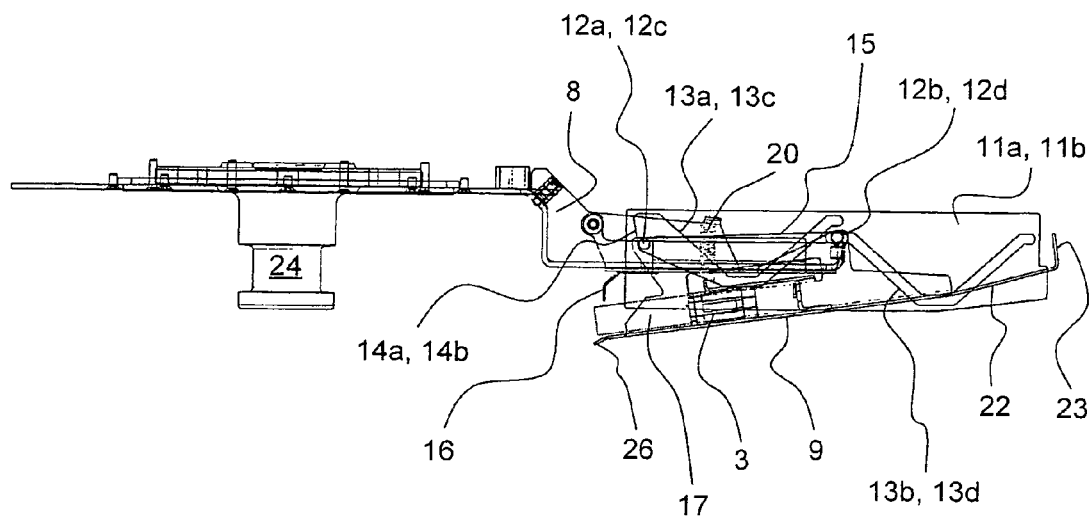
FIG. 9a: a side view of a connector bracket after the mounting of a semitrailer and connector and socket have made contact.
Figure 9B:
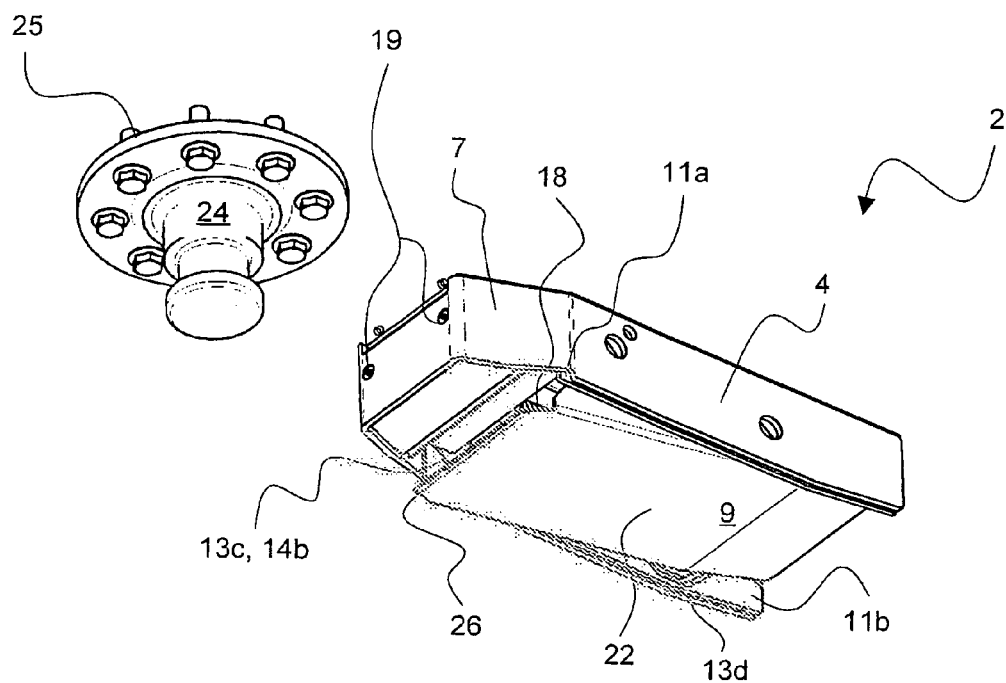

FIGS. 9a and 9b show the functional position of the connector bracket after reaching the end position of the king pin 24 within the closing region 28 when a socket 17 is present at the tractor side. The front guide cams 12a, 12c of the closing plate 9 have shifted inside the front links 13a, 13c to a forwardmost position and the rear guide cams 12b, 12d inside the rear links 13b, 13d have also shifted into a forwardmost position. The socket 17 engages with the connector 3, while the socket 17 partly sticks out from the support element 2 and prevents an upward closing of the closing plate 9 by a vertical spring 20. On the contrary, the front guide cams 12a, 12c lie against the lower edges of the front link leg 14, broadened like a funnel. In this now inclined position of the closing plate 9, the support element 2 is covered at the rear by the rear wall 23.

Figure 10A:
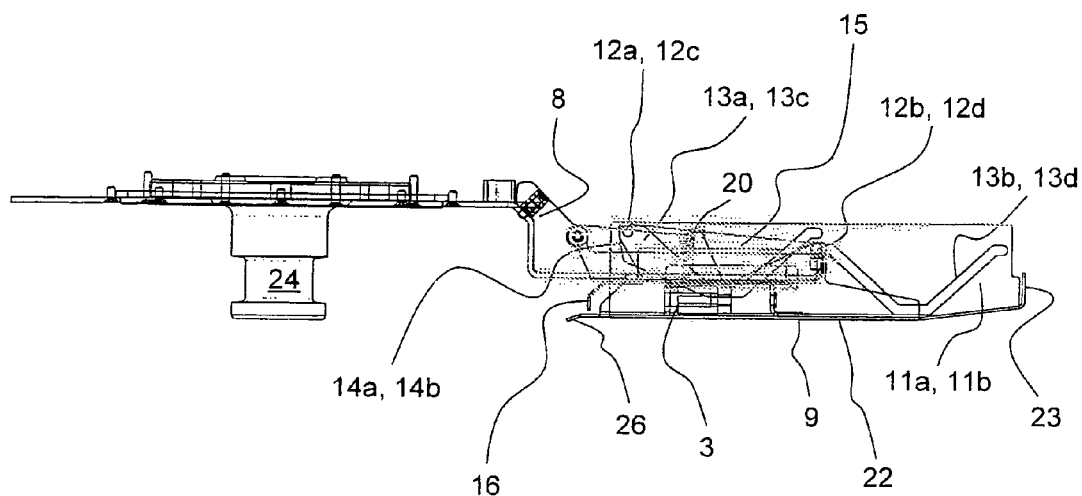
FIG. 10a: a side view of a connector bracket after the mounting of a semitrailer without making contact with a socket.
Figure 10B:
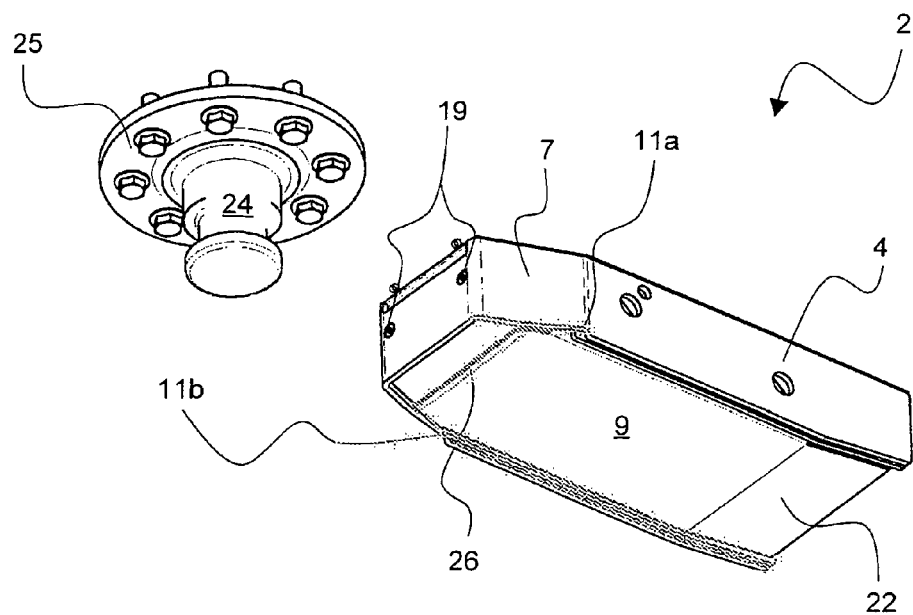

FIGS. 10a and 10b illustrate the mode of functioning of the connector bracket of the invention in the hooked-up state of a semitrailer with no socket 17 present at the tractor side, as is often the case with mixed trucking parks. In this case, the link walls 11a, 11b are in the same backward forced position in accordance with FIGS. 9a, 9b. Due to the lack of a socket 17 and the tension force of two vertical springs 20, however, the front guide cams 12a, 12c are pulled against the upper edge in the front link legs 14a, 14b. The closing plate 9 is oriented approximately horizontal and the connector 3 is covered in front by the shutter 16. At the rear, the casing frame 4 is additionally closed by the rear wall 23.

LIST OF REFERENCE NUMBERS

1 bearing
2 support element
3 connector
4 casing frame
5 insertion opening
6 fifth wheel
7 casing frame segment
8 support frame
9 closing plate
10 restricted guidance
11a, b link wall
12a-d guide cam of closing plate
13a-d link
14a, b front link leg
15 lever plate
16 shutter of lever plate
17 socket
17a current-conducting contacts
18 casing return spring
19 guide rail
20 vertical spring
21 closing shutter of socket
22 bottom wall of closing plate
23 rear wall of closing plate
24 king pin
25 fastening disk of king pin
26 entry edge of closing plate
27 socket mount
27a oblong hole of socket mount
28 closing region of fifth wheel
29 slide bearing
30 rear wall of casing frame
31 side wall of insertion opening
32a, b side pieces of closing plate
33 front fastening hole of lever plate
34 rear fastening hole of lever plate
35 projection

What is claimed is:

1. A connector bracket for a semitrailer of a semitrailer truck, comprising: a support element which can swivel about a bearing and a connector arranged in the support element, the support element having a casing frame with a segment shaped complementary to an insertion opening of a fifth wheel, wherein the casing frame can move relative to the connector by making contact with the insertion opening and thus the connector can travel from a closed standby position to an opened coupling position.

2. The connector bracket according to claim 1, wherein the support element comprises a support frame, which engages with the bearing.

3. The connector bracket according to claim 2, wherein the connector is arranged on a closing plate, which is guided relative to the casing frame by means of a restricted guidance.

4. The connector bracket according to claim 3, wherein the restricted guidance is a link motion.

5. The connector bracket according to claim 4, wherein the link motion comprises two link walls formed stationary on the casing frame and guide cams of the closing plate engaging with the link walls.

6. The connector bracket according to claim 5, wherein the link walls are arranged on opposite sides of the casing frame.

7. The connector bracket according to claim 5, wherein the link wall is formed by two U-shaped links.

8. The connector bracket according to claim 7, wherein the links are arranged staggered in a horizontal direction next to each other.

9. The connector bracket according to claim 7, wherein the front U-shaped link has a front leg which broadens in a driving direction.

10. The connector bracket according to claim 3, wherein the support element has a lever plate, which is articulated by a first end to the support frame and by an opposite second end to the closing plate.

11. The connector bracket according to claim 10, wherein the lever plate or the support frame is configured with a shutter, which covers the connector when the casing frame is in the retracted position and no socket is present on a tractor vehicle.

12. The connector bracket according to claim 10, wherein at least one casing return spring is arranged between the support frame or the lever plate and the casing frame.

13. The connector bracket according to claim 1, wherein at least one guide rail is arranged in a lengthwise direction in the casing frame.

14. The connector bracket according to claim 13, wherein the at least one guide rail is led through the support frame.

15. The connector bracket according to claim 3, wherein at least one vertical spring is arranged between the support frame or the lever plate and the closing plate.

16. The connector bracket according to claim 3, wherein the closing plate is flexible in configuration and installed with pretension in the closed position.

\* \* \* \* \*